(12) United States Patent
Andrews et al.

(10) Patent No.: US 10,368,476 B2
(45) Date of Patent: Aug. 6, 2019

(54) FERTILIZER CLOSING TANDEM

(71) Applicant: CNH Industrial America LLC, New Holland, PA (US)

(72) Inventors: Jason Andrews, Goodfield, IL (US); Derek Sicheneder, Morton, IL (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 15/229,735

(22) Filed: Aug. 5, 2016

(65) Prior Publication Data

US 2017/0034993 A1 Feb. 9, 2017

Related U.S. Application Data

(60) Provisional application No. 62/202,337, filed on Aug. 7, 2015.

(51) Int. Cl.
  *A01C 5/06* (2006.01)
  *A01C 23/00* (2006.01)

(52) U.S. Cl.
  CPC .............. *A01C 5/068* (2013.01); *A01C 5/064* (2013.01); *A01C 5/066* (2013.01); *A01C 23/008* (2013.01)

(58) Field of Classification Search
  CPC ........... A01C 5/06; A01C 23/00; A01C 5/066; A01C 5/068; A01C 23/04; A01C 5/064
  USPC ......................................... 111/121, 190–196
  See application file for complete search history.

(56) References Cited

U.S. PATENT DOCUMENTS

| | | | |
|---|---|---|---|
| 9,192,088 B2* | 11/2015 | Bruce | A01B 49/06 |
| 9,585,302 B2* | 3/2017 | Anderson | A01C 5/066 |
| 2013/0206431 A1* | 8/2013 | Freed | A01B 49/027 |
| | | | 172/1 |
| 2014/0034344 A1* | 2/2014 | Bassett | A01B 59/00 |
| | | | 172/705 |
| 2016/0066500 A1* | 3/2016 | Bruns | A01C 5/064 |
| | | | 111/163 |
| 2016/0374258 A1* | 12/2016 | Schaffert | A01C 5/066 |
| | | | 172/773 |
| 2017/0079193 A1* | 3/2017 | Sheppard | A01C 5/064 |

* cited by examiner

*Primary Examiner* — Alicia Torres
(74) *Attorney, Agent, or Firm* — Rebecca L. Henkel; Rickard K. DeMille

(57) ABSTRACT

An agricultural vehicle includes a chassis; a storage tank carried by the chassis; and a row unit carried by the chassis. The row unit includes: a row body; an opening blade carried by the row body and configured to open a trench as the row body is carried in a direction of travel; and a closing tandem carried by the row body behind the opening blade that is pivotally movable relative to the row body. The closing tandem includes a closing disc and a press wheel carried behind the closing disc, the closing disc and the press wheel being configured to rotate as the row body is carried in the direction of travel, the closing disc defining a projection path as it rotates, and the press wheel having a treaded surface in the projection path.

15 Claims, 5 Drawing Sheets

FERTILIZER CLOSING TANDEM

CROSS REFERENCE TO RELATED APPLICATIONS

This is a non-provisional application based upon U.S. provisional patent application Ser. No. 62/202,337, entitled "FERTILIZER CLOSING ASSEMBLY", filed Aug. 7, 2015, which is incorporated herein by reference.

BACKGROUND OF THE INVENTION

1. Field of the Invention

The present invention relates to agricultural vehicles, and, more particularly, to closing assemblies for use with fertilizer toolbars.

2. Description of the Related Art

To fertilize a field before and after planting, a fertilizer toolbar or other agricultural vehicle can be utilized. The agricultural vehicle can include multiple laterally spaced apart row units that are carried parallel to one another as the agricultural vehicle travels across the field. One or more of the row units can include an opening blade, which can be a coulter blade, that will cut a trench into the field. After the trench is cut into the field, fertilizer, such as gaseous anhydrous ammonia ($NH_3$), can be injected into the trench by an applicator to associate with ground moisture (liquefying in the process) and provide nutrients to the soil and subsequently planted crops. A closing disc can be carried behind the applicator to close the trench and form a sealed cavity that the anhydrous ammonia will be held within. It is especially important if the anhydrous ammonia is injected into the trench as a gas that the trench is completely closed to form the sealed cavity or the ammonia gas will be able to escape from the cavity before becoming a liquid in the soil, which can lead to inadequately fertilized spots in the field and reduced crop yield.

Several difficulties exist in designing closing disc systems to form the sealed cavity. One particular difficulty arises when the closing disc system travels through a field with varying soil conditions. For example, the soil in one part of the field may be softer than the soil in a different part of the field. In order to close the formed trenches in the harder soil, the closing disc needs to exert more force on the ground that can cause excessive soil disturbance in the softer soil region of the field. Further, known closing disc systems tend to cause loose soil to be created that can wash away down the field during rain, causing a loss of soil and potential damage to crops. The loose soil can also be projected by the closing disc into adjacent rows that needs to be sealed, which can cover or remove crops in the adjacent rows with the loose soil.

Another problem with row units in general is that as the coulter blade cuts the trench into the soil, the coulter blade can lift soil on the opposite side of the blade from where the applicator injects fertilizer. This can leave an open slot in the soil that the closing disc is not able to close and provides a leak path for fertilizer to escape.

Yet another problem is that the closing disc can be lifted off the ground as it is carried across the field due to irregularities in the field. This causes the closing disc to come out of contact with the field and can cause the closing disc to skip over areas that need to be closed and not effectively cover the trench with soil.

What is needed in the art is a row unit that can overcome some of the previously described disadvantages of known row units and closing disc systems.

SUMMARY OF THE INVENTION

The present invention provides a row unit with a closing tandem that includes a closing disc and a press wheel carried on asymmetrical arms or aligned so that the press wheel has a treaded surface in a projection path of the closing disc to return projected soil to the ground as the row unit is carried across the ground.

The invention in one form is directed to an agricultural vehicle including: a chassis; a storage tank carried by the chassis; and a row unit carried by the chassis. The row unit includes: a row body; an opening blade carried by the row body and configured to open a trench as the row body is carried in a direction of travel; and a closing tandem carried by the row body behind the opening blade that is pivotally movable relative to the row body. The closing tandem includes a closing disc and a press wheel carried behind the closing disc, the closing disc and the press wheel being configured to rotate as the row body is carried in the direction of travel, the closing disc defining a projection path as it rotates, and the press wheel having a treaded surface in the projection path.

The invention in another form is directed to an agricultural vehicle including: a chassis; a storage tank carried by the chassis; and a row unit carried by the chassis. The row unit includes: a row body; an opening blade carried by the row body that is configured to open a trench as the row body is carried in a direction of travel; and a closing tandem carried by the row body behind the opening blade and pivotally movable relative to the row body about a pivot point. The closing tandem includes a closing arm connected to a closing disc and a press arm connected to a press wheel, the closing arm defining a closing lever length between the closing disc and the pivot point and the press arm defining a press lever length between the press wheel and the pivot point that is less than the closing lever length.

An advantage of the present invention is that loose soil projected by the closing disc is projected into the treaded surface of the press wheel which can then roll the soil back onto the closed trench as the row unit is carried across the field, sealing the trench with the returned soil.

Another advantage is the press wheel can close the trench without collapsing the trench, allowing for a sealed pocket of gaseous fertilizer to be formed.

Yet another advantage is the asymmetrical closing tandem allows for sufficient down pressure to be exerted on the press wheel to press down on the soil as the row unit travels across the field.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
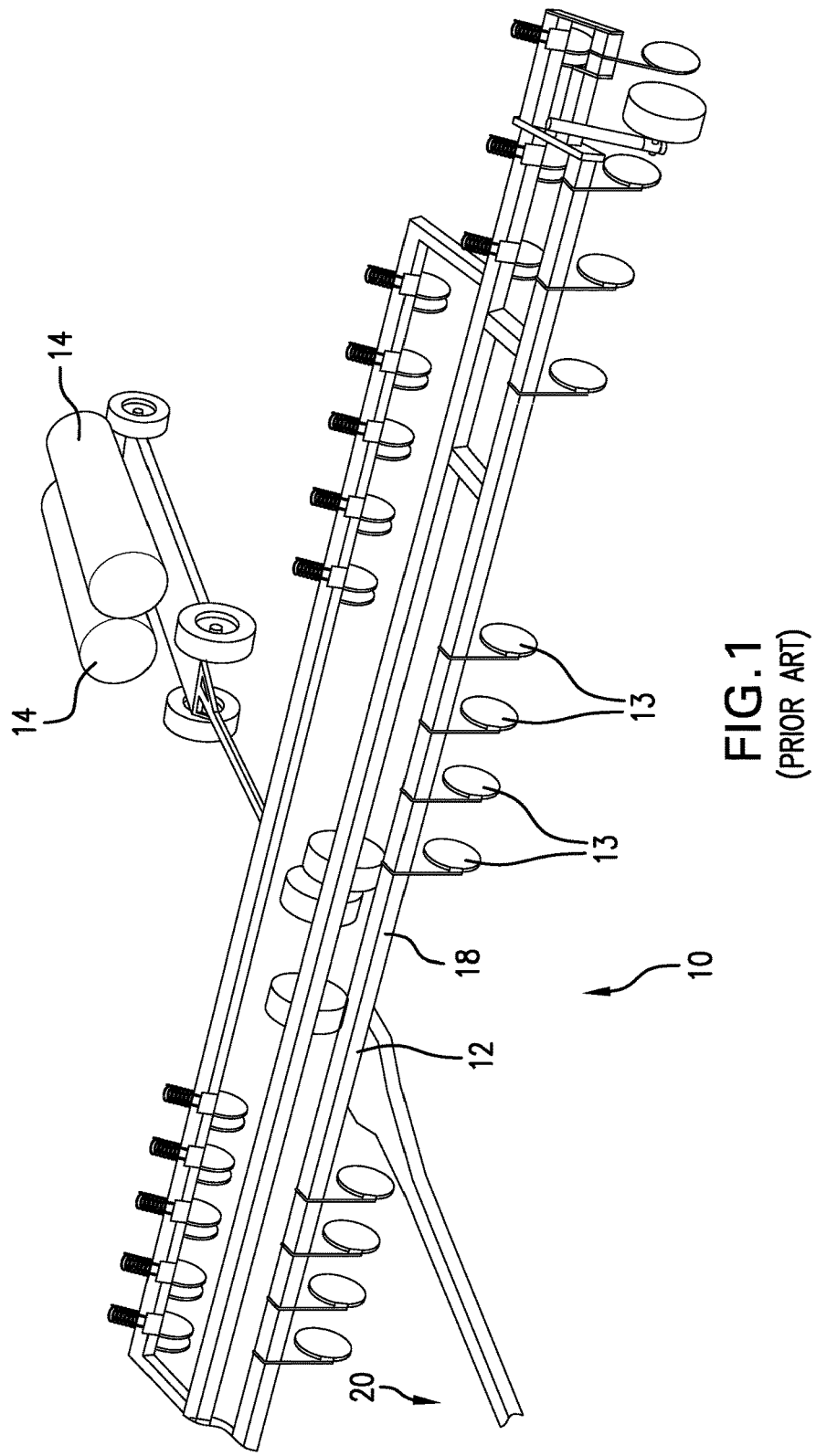
FIG. 1 is a perspective view of an embodiment of a prior art agricultural vehicle.

Referring now to the drawings, and more particularly to FIG. 1, there is shown an agricultural vehicle 10 of the prior art which generally includes a chassis 12, one or more storage tanks 14 carried by the chassis 12, and a plurality of laterally spaced apart row units 13 that can be connected to a tool bar 18 in parallel so as to be carried by the chassis 12 as the vehicle 10 travels across a field. As can be seen, the agricultural vehicle 10 can be an implement carried by a tractor (not shown) but it is also contemplated that the agricultural vehicle 10 can be self-propelled to travel across the field without needing to be pulled by another vehicle. The vehicle 10 can also include a hitch assembly 20 to connect to a tractor, if necessary. The storage tanks 14 can be carried behind the chassis 12, as shown, and configured to hold any type of desired material, such as anhydrous ammonia fertilizer in liquid or gas form. Further, the storage tanks 14 can be connected to the row units 13 by various tubes, which are unnumbered, so that material held in the storage tanks 14 can be supplied to the row units 13.

Figure 2:
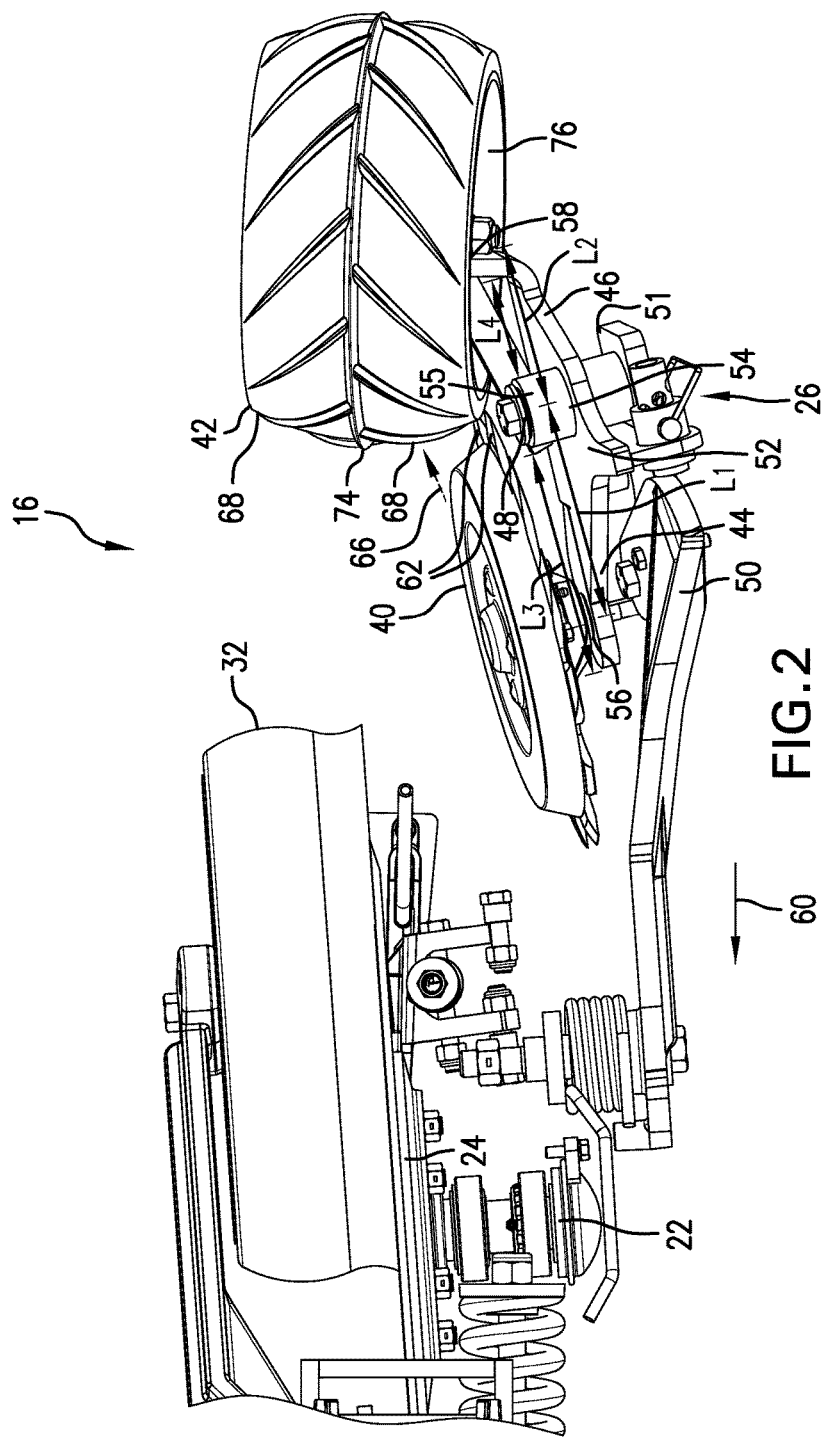
FIG. 2 is a top view of an embodiment of a row unit according to the present invention that can be carried by the agricultural vehicle shown in FIG. 1.
Figure 3:
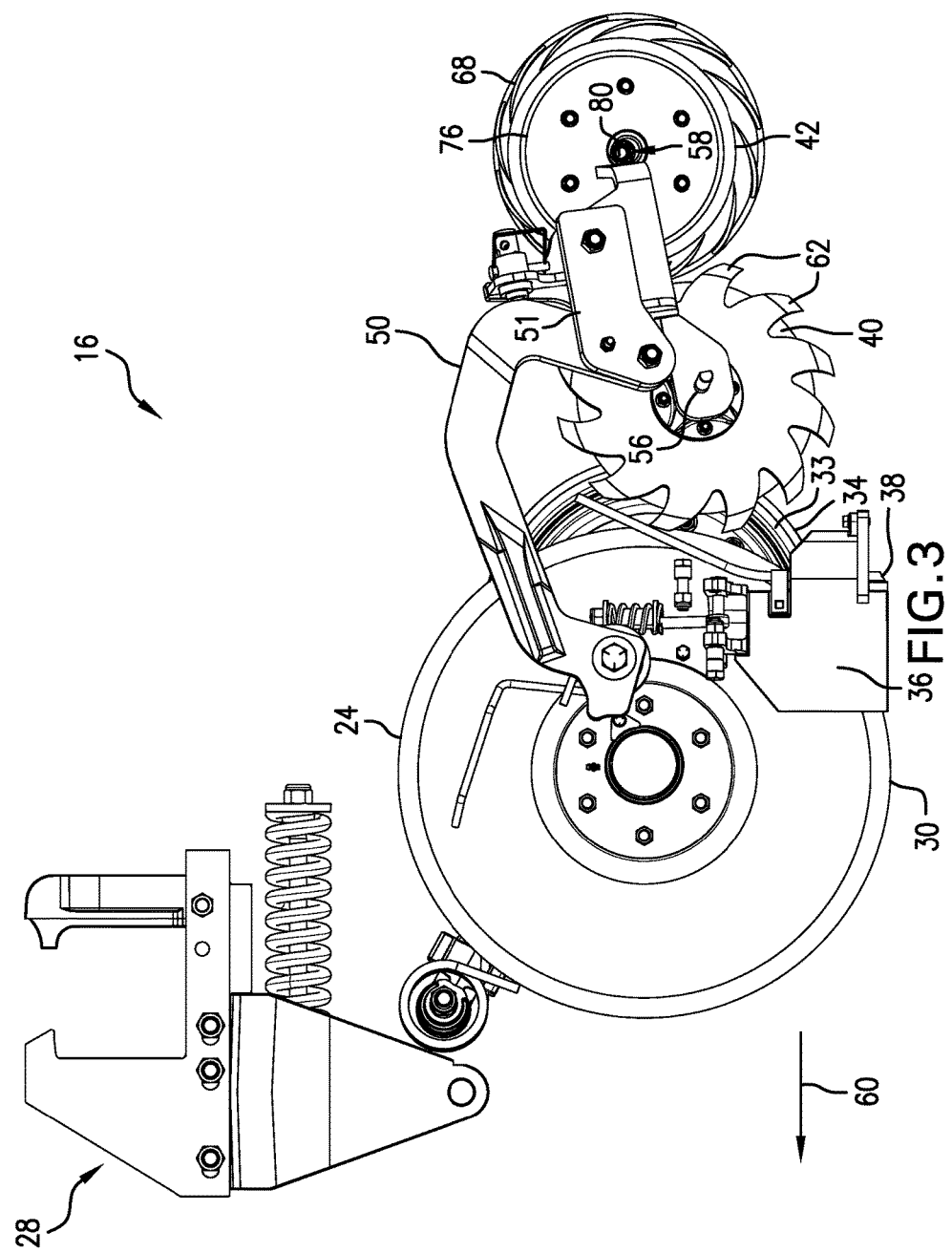
FIG. 3 is a side view of the row unit shown in FIG. 2.
Figure 4:
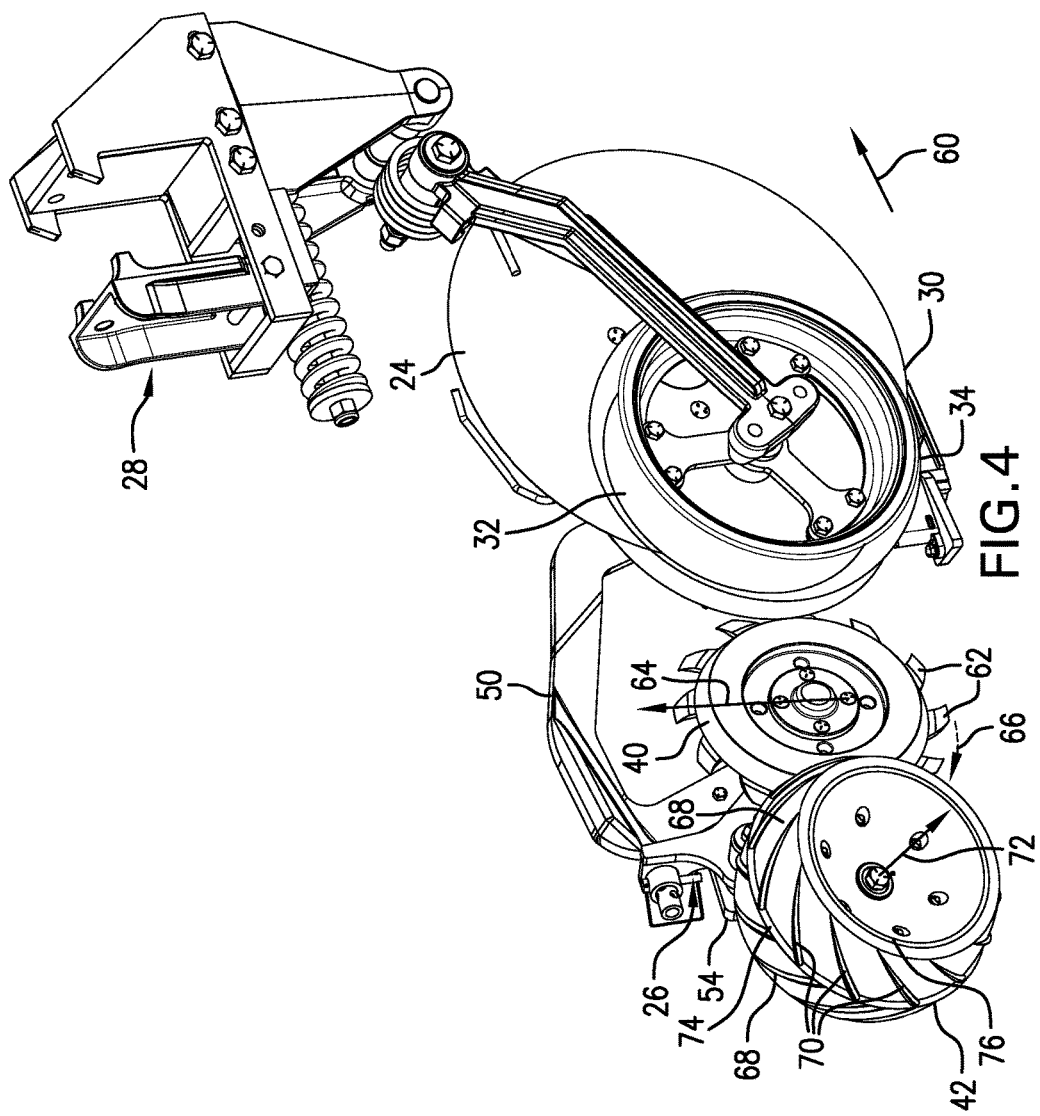
FIG. 4 is a perspective view of the row unit shown in FIGS. 2-3.

Referring now to FIGS. 2-5, an embodiment of a row unit 16 according to the present invention is shown that is used in place of the row units 13 shown in FIG. 1 and generally includes a row body 22, an opening blade 24 carried by the row body 22, and a closing tandem 26 carried by the row body 22 behind the opening blade 24. As can be seen, the row body 22 acts as a support structure for the components of the row unit 16 and is therefore analogous to the chassis 12 of the agricultural vehicle 10. As best shown in FIGS. 3-4, the row body 22 can be connected to the tool bar 18 by a connection assembly 28 that will hook onto the tool bar 18 and allow the row unit 16 to be carried by the agricultural vehicle 10. The opening blade 24, which can be a coulter blade as shown, is held so that a cutting edge 30 of the blade 24 can come into contact with the ground as the row body 22 is carried across the field by the agricultural vehicle 10. While the opening blade 24 is shown as a round coulter blade that will rotate and cut into the ground as the row body 22 is carried, the opening blade 24 can be formed as any type of construction that can cut a desired trench into the ground as the row body 22 is carried. A wiper wheel 32 can be carried by the row body 22 next to the opening blade 24 to help prevent the berm of the formed trench from blowing out or rolling over as the coulter blade 24 cuts into the ground in front of the already formed trench as the row body 22 is carried. As shown, the wiper wheel 32 is on a lateral side of the opening blade 24 and has a bottom 34 that will press into the ground as the row body 22 is carried across the field.

A fertilizer applicator 36 can be carried by the row body 22 that is connected to a source of fertilizer, such as one of the storage tanks 14, and distributes the fertilizer downward into the trench that is formed by the opening blade 24 as the row unit 16 is carried. The fertilizer applicator 36 can be any type of suitable applicator for one or more applications. For example, the fertilizer applicator 36 can be configured to distribute one or more different fertilizers, such as liquid or gaseous ammonia, as mist sprays having various droplet size. It should be appreciated that the fertilizer applicator 36 can be carried so that the fertilizer applicator 36 has a distributing tip 38 behind the opening blade 24, so long as fertilizer that is expelled from the fertilizer applicator 36 through the distributing tip 38 is directed toward the trench formed by the opening blade 24.

Referring specifically now to FIG. 2, it can be seen that the closing tandem 26 includes a closing disc 40 and a press wheel 42. The closing disc 40 can be connected to a closing arm 44 and the press wheel 42 can be connected to a press arm 46 which is connected to the closing arm 44, with both arms 44, 46 pivoting about a pivoting member 48 that is connected to the row body 22 by a pivot arm 50, with the pivoting member 48 connecting to the pivot arm 50 by a pivot plate 51. The pivoting member 48 can therefore define a pivot point for the closing tandem 26. The pivot plate 51 can be connected to the pivot arm 50 where just a closing disc normally would be, allowing for the closing tandem 26 to easily bolt onto an existing row unit to replace the unit's closing disc with the closing tandem 26. To pivot about the pivoting member 48, the closing tandem 26 can have a pivoting portion 52 with a pivoting opening 54 that slides over a bushing 55 placed over the pivoting member 48 and is formed in a region of the closing tandem 26 where the closing arm 44 is connected to the press arm 46. In this sense, the closing arm 44 and press arm 46 can act as lever arms for the closing disc 40 and press wheel 42, respectively. The closing arm 44 can connect to the closing disc 40 at a closing disc connection point 56, shown as an opening formed in the closing arm 44, that can define a closing disc distance L1 from the pivot point 48, with the length of the closing arm 44 between the pivot point 48 and the closing disc connection point 56 defining a closing lever length that is equal to the closing disc distance L1. Similarly, the press arm 46 can connect to the press wheel 42 at a press wheel connection point 58, also shown as an opening formed in the press arm 46, that can define a press wheel distance L2 from the pivot point 48, with the length of the press arm 46 between the pivot point 48 and the press wheel connection point 58 defining a press lever length that is equal to the press wheel distance L2 and is less than the closing lever length. This asymmetry allows for the weight of the press wheel 42, which can be less than the weight of the closing disc 40, to reduce the pressure on the closing disc 40 as the closing tandem 26 is carried by the row body 22 and create a better spread of soil that is projected by the closing disc 40 while still allowing for the closing disc 40 to apply enough down pressure on the press wheel 42 to press into the ground as the row unit 16 is carried. The arms 44 and 46, therefore, can be thought of as forming a simple lever between the closing disc 40 and press wheel 42 with the pivoting member 48 and bushing 55 acting as the fulcrum of the lever. It should be appreciated therefore that the closing arm 44 can have a closing arm length L3 that is greater than a press arm length L4 of the press arm 46 and the closing disc 40 and press wheel 42 connect to their respective arms 44 and 46 at ends of the arms 44 and 46. Further, the closing disc connection point 56 and the press wheel connection point 58 can both define rotational connection points of the closing disc 40 and press wheel 42, respectively, that the closing disc 40 and press wheel 42 will rotate about as the row unit 16 is carried by the agricultural vehicle 10.

As the row unit 16 advances across a field in a direction of travel, designated by arrow 60, the opening blade 24 digs into the ground to form a trench. The closing disc 40 will also rotate as the row unit 16 advances across the field and dig into the ground on a lateral side of the formed trench with one or more cutting elements 62, shown as teeth, that can replace the soil on top of the trench to form a covered trench for the fertilizer that the fertilizer applicator 36 distributes into the trench. As can be seen in FIGS. 3-4, the teeth 62 can have a curved shape so that as the row unit 16 advances in the direction of travel 60 and the teeth 62 dig into the soil, the teeth 62 scoop up soil and project soil into the formed trench. While a formed trench is not shown in the figures, it should be appreciated that the formed trench will be formed as a line that extends in the direction of travel 60 at the cutting edge 30 of the opening blade 24. The cutting edge 30 of the opening blade 24 therefore approximates the leading edge of the formed trench.

As can be seen in, for example, FIG. 4, the closing disc 40 is tilted in a first horizontal direction, designated by line 64, so that the teeth 62 will project soil back into the formed trench as the row unit 16 advances in the direction of travel 60. As the closing disc 40 rotates, the teeth 62 will cut into the soil and scoop the soil toward the trench. In this sense, the teeth 62 of the closing disc 40 project soil generally lateral with respect to the direction of travel 60, toward where the formed trench is. However, as the teeth 62 rotate and project soil, the teeth 62 will also tend to project soil in a direction opposite the direction of travel 60. In this sense, the closing disc 40 defines a projection path, shown as dashed arrow 66, that the bulk of the soil projected by the closing disc 40 will follow as the closing disc 40 is carried across the field and is determined by the shape of the teeth 62. As can be seen, the projection path 66 is directed toward the formed trench, which is desired, but too much force exerted on the soil by the teeth 62 can cause excessive soil travel that will displace soil away from the trench and place loose soil on the field that can be washed away.

To reduce the amount of soil that is displaced from the trench and to help seal the trench, the press wheel 42 is placed in the projection path 66 so that as soil is projected by the closing disc 40, the soil will contact a treaded surface 68 of the press wheel 42 and be forced back toward the trench as the press wheel 42 rotates, rather than freely traveling away from the trench. The treaded surface 68 can include as many treads 70 as desired, with the treads 70 impeding soil that contacts the treaded surface 68 from sliding across the press wheel 42 rather than being caught by the press wheel 42. In this sense, the press wheel 42 serves multiple functions simultaneously by catching the projected soil on the treads 70 as the soil travels, returning the caught soil to the trench as the press wheel 42 rotates, and pressing the dirt placed on top of the trench to form a sealed cavity that holds fertilizer within. To better catch the projected soil and replace it on the trench, the press wheel 42 can be horizontally tilted in a second horizontal direction, designated by arrow 72, that is opposite the first horizontal direction 64 that the closing disc 40 is tilted. This allows the soil that is projected by the closing disc 40 in the projection path 60 due to the closing disc 40 being tilted in the first horizontal direction 64 to be re-directed back toward the formed trench by the press wheel 42 being tilted in the second horizontal direction 72 that is opposite to the first horizontal direction 64. In this sense, both the closing disc 40 and press wheel 42 can be held to form compound angles relative to a plane that is perpendicular to the direction of travel 60. The press wheel 42, for example, can be horizontally tilted so as to define a camber angle of between 0 and 12 degrees, with a camber angle of between 5 and 7.5 degrees being useful for common applications.

To form a sealed cavity from the trench, the press wheel 42 can be configured so that it presses on the soil covering the trench without collapsing the trench. To achieve this, the camber angle of the press wheel 42 can be adjusted and the press wheel 42 can include a crown 74 that defines an outermost ring along the circumference of the press wheel 42. Two treaded surfaces 68 can attach to the crown 74 and a rim 76 of the press wheel 42 to form a semi-pneumatic press wheel 42 that has been found to seal the formed trench without collapsing the trench. Such a press wheel 42 is currently sold by CASE IH®, but other wheels can also be used.

Figure 5:
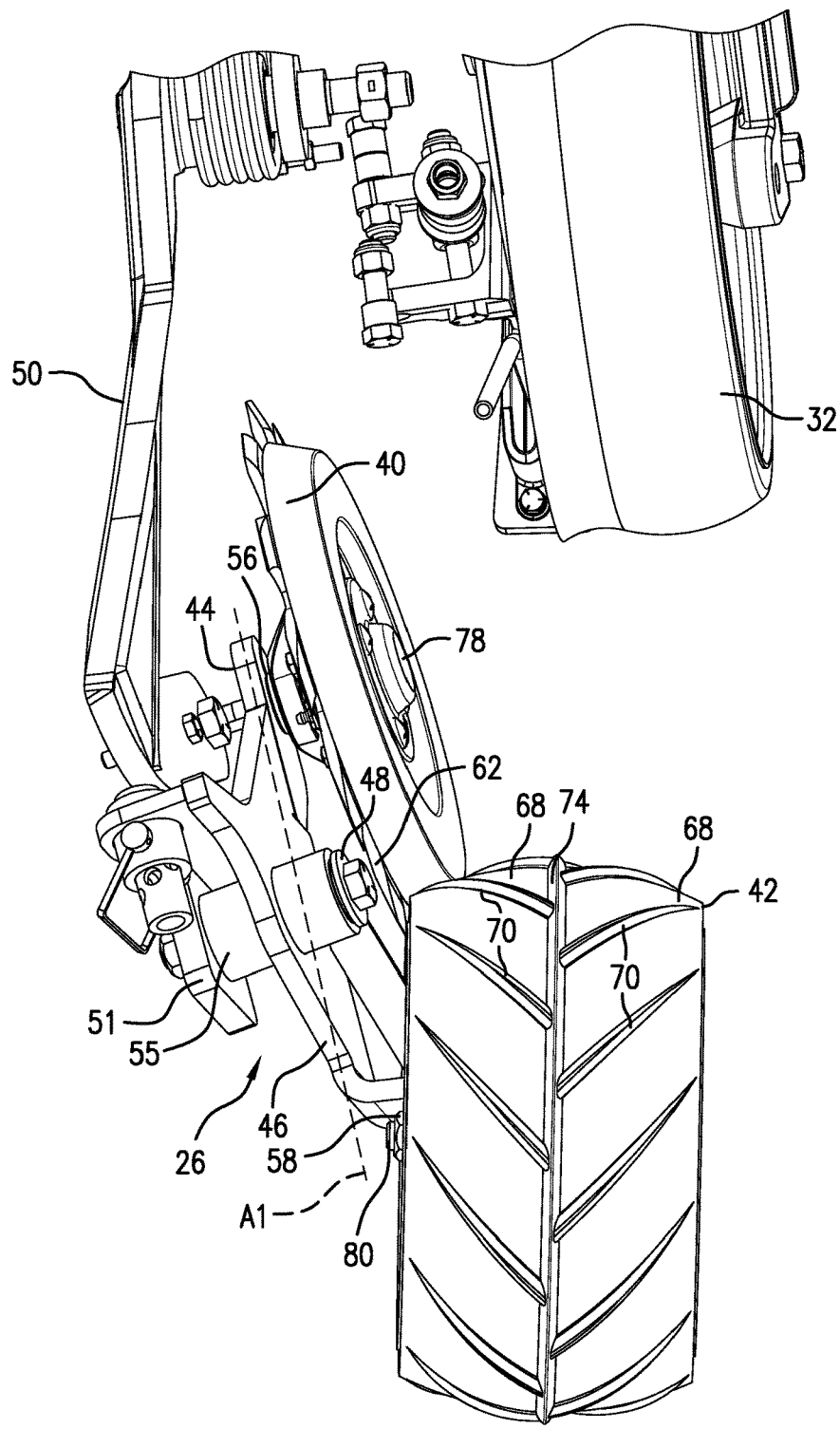
FIG. 5 is another perspective view of the row unit shown in FIGS. 2-4.

To illustrate the tilting relationship between the closing disc 40 and press wheel 42, FIG. 5 shows the closing arm 44 and press arm 46 defining a lever axis A1 therethrough that shows the relative positioning of the closing disc connection point 56 and the press wheel connection point 58 relative to the pivoting member 48. As can be seen, the closing disc 40 can rotate about a rotation rod 78, which can be referred to as a rotational center of the closing disc 40, that is held generally orthogonal to the lever axis A1 while the press wheel 42 rotates about a second rotation rod 80, which can be referred to as a rotational center of the press wheel 42, that is held at an angle relative to the lever axis A1. As illustrated in FIG. 2, however, it can be seen that, relative to the direction of travel 60, the second rotation rod 80 can be held generally perpendicular while the rotation rod 78 is held at a compound angle. This orientation allows the press wheel 42 to be horizontally tilted to catch projected soil that is disturbed by the closing disc 40 while rolling with the direction of travel 60 to lessen soil movement caused by sliding of the press wheel 42. It should therefore be appreciated that the closing tandem 26 orients the closing disc 40 and press wheel 42 such that the closing disc 40 can mostly fill the trench created by the opening blade 24 by moving soil and the press wheel 42 can catch and return soil that would otherwise be displaced from the area back to the trench and pack soil on top of the trench to form a sealed cavity in the ground that can seal in misted liquid or gaseous fertilizer, allowing the fertilizer to dissolve in ground moisture and provide nutrients to the soil.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural vehicle, comprising:
a chassis;
a storage tank carried by the chassis; and
a row unit carried by the chassis, the row unit including:
   a row body;
   an opening blade carried by the row body and configured to open a trench as the row body is carried in a direction of travel;
   a pivot arm comprising a first end and a second end, wherein the first end is connected to the row body and the pivot arm extends from the row body toward the second end in a direction substantially opposite to the direction of travel;

a closing tandem carried by the row body behind the opening blade and pivotally movable relative to the row body, the closing tandem including
a pivot plate connected to the second end of the pivot arm, wherein the pivot plate and the pivot arm are positioned at different angles relative to the direction of travel;
a closing tandem arm connected to the pivot plate via a first bushing positioned between the pivot plate and a surface of the closing tandem arm and configured to provide a spaced-apart orientation between the pivot plate and the surface of the closing tandem arm, the closing tandem arm including a closing arm at one end and a press arm at an opposite end;
a closing disc rotatably connected to the closing arm; and
a press wheel rotatably connected to the press arm, wherein the closing tandem arm is longitudinally aligned along a longitudinal axis which extends through the closing arm and the press arm.

2. The agricultural vehicle according to claim 1, wherein the closing disc is horizontally tilted in a first horizontal direction and the press wheel is horizontally tilted in a second horizontal direction that is opposite to the first horizontal direction.

3. The agricultural vehicle according to claim 1, wherein the press wheel defines a camber angle between 0 and 12 degrees.

4. The agricultural vehicle according to claim 3, wherein the camber angle is between 5 and 7.5 degrees.

5. The agricultural vehicle according to claim 1, wherein the press wheel rotates about a rotation rod that is held perpendicular to the direction of travel.

6. The agricultural vehicle according to claim 1, wherein the press wheel includes a crown ridge projection which extends outwardly about a circumference of the press wheel and a plurality of spaced-apart side projections which extend laterally away from the crown ridge projection.

7. The agricultural vehicle according to claim 1, wherein a second bushing is positioned opposite to the first bushing on an opposite surface of the closing tandem arm.

8. The agricultural vehicle according to claim 1, wherein the closing arm defines a closing arm length and the press arm defines a press arm length that is less than the closing arm length.

9. The agricultural vehicle according to claim 1, wherein the closing tandem arm pivots about a pivoting member, and a rotational center of the closing disc is positioned farther from the pivoting member than a rotational center of the press wheel.

10. The agricultural vehicle according to claim 9, wherein the closing disc has a closing disc weight and the press wheel has a press wheel weight that is less than the closing disc weight.

11. An agricultural vehicle, comprising:
a chassis;
a storage tank carried by the chassis; and
a row unit carried by the chassis, the row unit including:
a row body;
a pivot arm comprising a first end and a second end, wherein the first end is connected to the row body and the pivot arm extends from the row body toward the second end in a direction substantially opposite to the direction of travel;
an opening blade carried by the row body and configured to open a trench as the row body is carried in a direction of travel; and
a closing tandem carried by the row body behind the opening blade and pivotally movable relative to the row body about the pivot point, the closing tandem including
a pivot plate connected to the second end of the pivot arm, wherein the pivot plate and the pivot arm are positioned at different angles relative to the direction of travel;
a closing tandem arm connected to the pivot plate via a first bushing positioned between the pivot plate and a surface of the closing tandem arm and configured to provide a spaced-apart orientation between the pivot plate and the closing tandem arm, the closing tandem arm including a closing arm at one end and a press arm at an opposite end;
a closing disc rotatably connected to the closing arm; and
a press wheel rotatably connected to the press arm, wherein the closing tandem arm is longitudinally aligned along a longitudinal axis which extends through the closing arm and the press arm.

12. The agricultural vehicle according to claim 11, wherein the closing disc is horizontally tilted in a first horizontal direction and the press wheel is horizontally tilted in a second horizontal direction that is opposite to the first horizontal direction.

13. The agricultural vehicle according to claim 11, wherein the press wheel includes a crown ridge projection which extends outwardly about a circumference of the press wheel and a plurality of spaced-apart side projections which extend laterally away from the crown ridge projection.

14. The agricultural vehicle according to claim 11, wherein a second bushing is positioned opposite to the first bushing on an opposite surface of the closing tandem arm.

15. The agricultural vehicle according to claim 11, wherein the closing arm has a closing arm length and the press arm has a press arm length that is less than the closing arm length.

* * * * *